June 30, 1931. J. W. HUGHES 1,812,004
BAR STOCK FEED FOR ROLLING MILLS
Filed Dec. 23, 1927 9 Sheets-Sheet 1

Fig. 1.

INVENTOR:
James W. Hughes,
BY
ATTORNEY.

June 30, 1931. J. W. HUGHES 1,812,004
BAR STOCK FEED FOR ROLLING MILLS
Filed Dec. 23, 1927 9 Sheets-Sheet 5

INVENTOR:
James W. Hughes,
BY
ATTORNEY.

June 30, 1931.   J. W. HUGHES   1,812,004
BAR STOCK FEED FOR ROLLING MILLS
Filed Dec. 23, 1927   9 Sheets-Sheet 6

Fig. 7.

INVENTOR:
James W. Hughes,
BY
Johnr. Lonbox.
ATTORNEY.

June 30, 1931.    J. W. HUGHES    1,812,004
BAR STOCK FEED FOR ROLLING MILLS
Filed Dec. 23, 1927    9 Sheets-Sheet 7

INVENTOR:
James W. Hughes
BY
ATTORNEY.

June 30, 1931.　　　J. W. HUGHES　　　1,812,004

BAR STOCK FEED FOR ROLLING MILLS

Filed Dec. 23, 1927　　　9 Sheets-Sheet 8

INVENTOR:
James W. Hughes,
BY
ATTORNEY.

Patented June 30, 1931

1,812,004

UNITED STATES PATENT OFFICE

JAMES W. HUGHES, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

BAR STOCK FEED FOR ROLLING MILLS

Application filed December 23, 1927. Serial No. 242,064.

The automatic rolling mill feed of my invention relates particularly to the automatic feed of obtuse angled rolling mills. These mills are especially adapted for the making of wheels, parts of wheels such as hubs or wheel discs, and other circularly forged articles of relatively expansive area. Such articles are commonly made from very hot billets cut at the time or previously from bar stock. The cutting of the billets from the bar stock is sometimes done hot and sometimes done cold. The process of my invention is a continuous process which combines the feeding of the hot bars from the furnace in which they are heated through the cut-off and delivery to the rolling mill.

The principal object of my invention, the efficient continuous feeding of such rolling mill from the bar heating furnace, involves a very considerable number of subordinate objects some of which in importance approach that of the principal object itself. It is my aim to feed hot bar stock to the rolling mill in proportions appropriate to the articles being made, which is to say, general adjustability is an object. The accurate measurement of the portions fed is an object since inaccurate measurement means not only improper functioning of the feeding mechanism and the rolling mill or other forging machine, but also involves a waste of material through excess or through the production of faulty products. The combination of the cut-off and feeding elements of the mechanism has been aimed at with a view to simplifying and rendering more effective in operation the feeding mechanism as a whole. I have had as an object the certainty of reception of the billets by the forging machine as they are fed thereto with a view to deriving not only certainty of feed but certainty of alignment at the close of the feeding operation and greater general accuracy, uniformity and symmetry of product. Feeding the billets to the forging machine by the shortest possible path and with the least lost motion and lost time on said path, has been aimed at with a view not only of minimizing wear and insuring accuracy, but also and chiefly, of conserving in the billet the initial high temperatures of the bar itself so essential for full forming with minimum power. It has been endeavored to make the feed throughout as positive as may be, leaving room for neither chance of disarrangement nor necessity for manual manipulation. Improved accuracy results.

Another object has been the general simplification of a feeding mechanism necessarily more or less elaborate and of such large proportions, for many wheels and wheel parts are relatively of very large dimension. The forging machine itself is an immense affair built to withstand the tremendous forging pressures in forging steel. Achievement of an open and accessible construction is a parallel object to simplicity, through which not only is simplicity enhanced but the loss of heat from the billets by conduction is minimized, and conversely the feeding mechanism itself is protected from the high heat of the metal blank.

There are many lesser objects and advantages which will become known as the invention is understood both through its specification and its practice, but there is one other which should have special emphasis. It is the achievement of perfect feeding independently of delay of work upon the bar or the billets cut therefrom. This is of especial advantage when different kinds of power are used in one and the same machine, for example, when hydraulic is combined with mechanical power.

The feeding mechanism of my invention includes in combination with the rolling mill by means of which the articles are forged to completed form, a combined cut-off and feeding mechanism for the hot bar, a pre-press adapted to pre-shape the cut-off billets of the bar to appropriately be received by the rolling mill as fed, a transfer mechanism common to the three foregoing devices and transferring the cut-off billets from one of the aforesaid devices to another in succession, timing mechanism coordinating the movements and operations of all of the preceding devices and, an interlocking mechanism precluding interference from the timing mechanism in case of noncompletion of any working operation upon the billets. In general, the cut-off and feeding mechanism associated with the hot bar, the pre-press and the rolling mill are arranged with their axes of operation parallel and side by side, while the transfer mechanism operates transversely of these axes in straight line motion, and the timing and interlocking mechanism variously inter-connect and coordinate them.

Figure 1:
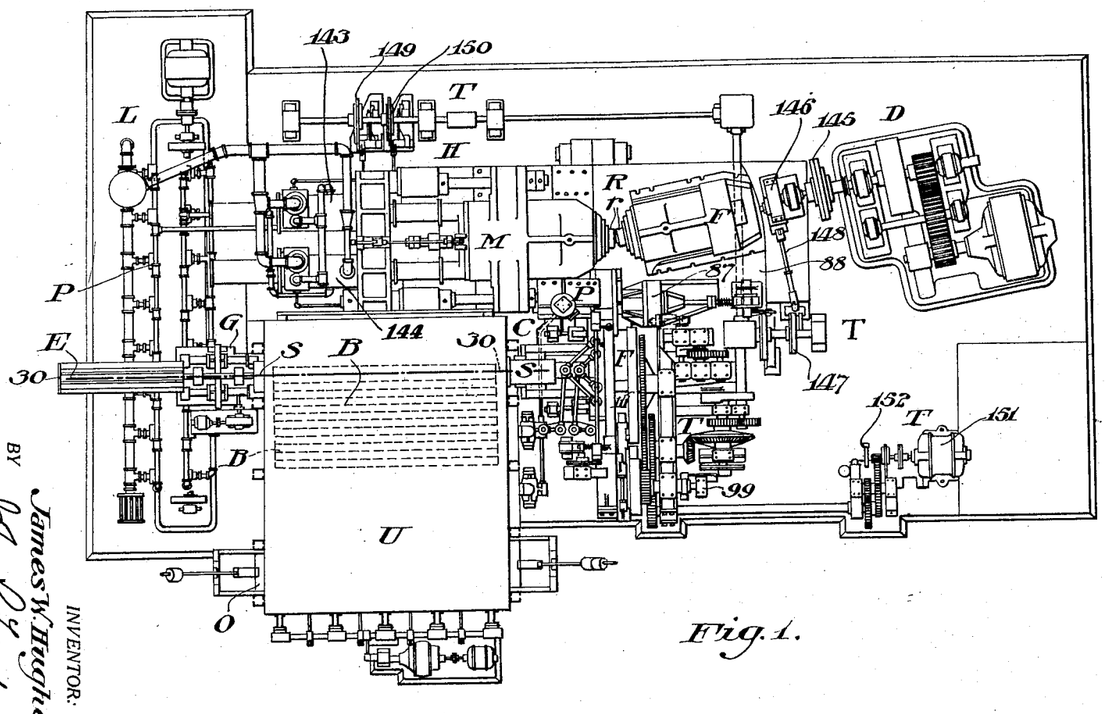
Fig. 1 is a general plan view of the entire apparatus.

Referring first to Figs. 1 to 4 and more particularly, to Fig. 1, the obtuse angled rolling mill which is the forging machine to be fed is designated in general R. This mill is the subject of my copending application, Serial No. 170,893, filed February 25, 1927, and need not be described therefore except as to essential details in this application. Its rolls are electrically driven through an electrical driving plant D and are approached toward and are receded from each other by a hydraulic approach and separation mechanism H. This approach and separation mechanism is supplied with power from the hydraulic power plant L.

Along side of the rolling mill is a continuous feed bar heating furnace U, the hot bars of which are cut into appropriate portions and automatically fed to the rolling mill R. This furnace U is so arranged that the bars within it lie parallel to the general direction of the principal axes of the rolling mill R. The bars B which it contains are fed into the furnace through doors O at the end remote from rolling mill R, and are ejected through doors S in the opposite end. An ejecting mechanism E including a plunger G, and the workings of which it is not necessary to describe herein since it is another invention, is utilized to push the bar nearest the rolling mill R partially from the furnace U and until its projected end is in a position to be engaged by the cut-off and feeding mechanism C immediately in front of the furnace U. The end of the bar in such position clearly appears in the plan view of Fig. 2.

The cut-off and feeding mechanism is as aforesaid designated C. Between this cut-off and feeding mechanism C and the rolling mill R lies the pre-press P, the function of which is to pre-shape the ends of the cut-off billets from the bar to the form most suited for certain feeding to, and certain reception and forming by the rolling mill R. The axes of these several mechanisms C, P, and R are substantially parallel as appears in Fig. 1 and inferentially in Fig. 4 and other figures.

The transfer mechanism designated F extends transversely of the cut-off and feeding mechanism C, the pre-press P and the rolling mill R, in a plane substantialy at right angles to the axes thereof and passing between the obtused angled rolls of the rolling mill R. The cut-off and feeding mechanism C and the pre-press P lie in the main between the transfer mechanism F and the furnace U.

T is the timing mechanism, a large portion of which is disposed in front of the transfer mechanism and in the angle between it and the side of the rolling mill R. The timing mechanism, however, is threaded throughout the apparatus as is clearly to be discerned by some portion of it on the opposite side of the rolling mill R from the furnace U. For the most part it consists of various timing gears and levers arranged to coordinately operate the several mechanisms of the apparatus.

Figure 18:
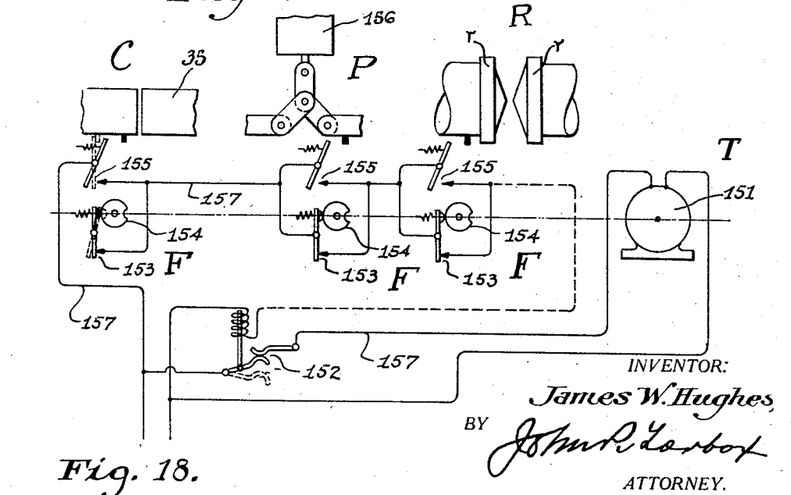
Fig. 18 is a diagrammatic illustration of electrical interlocks between the several mechanisms.

The interlocking mechanism also threads throughout the apparatus and is of such a character, consisting in the main of interlocked electrical circuits, that it cannot be generally designated in Figs. 1 to 4, and is diagrammed elementally in Fig. 18. However, the controlling switches of the interlocking mechanism are designated in connection with the respective parts which bear them by the numerals 153 and 155, as they appear in other figures of the drawings.

Figure 2:
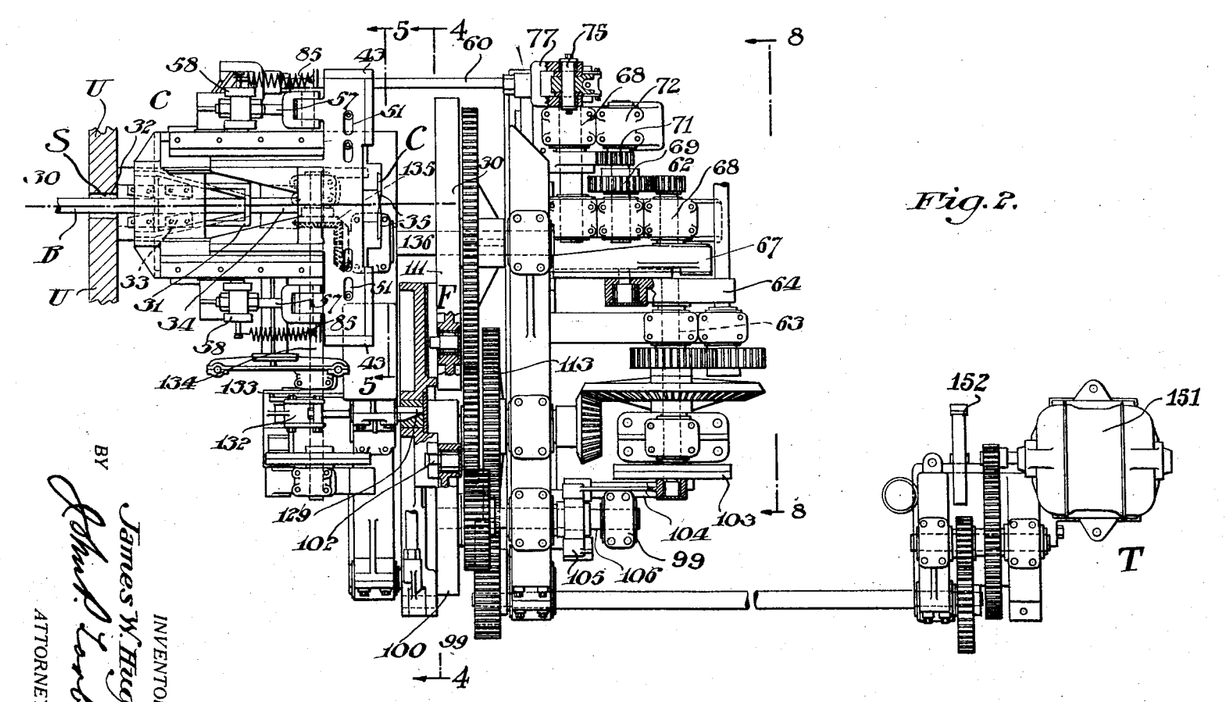
Fig. 2 is an enlarged plan view of the bar cut-off and feeding mechanism, the transfer mechanism and the principal portion of the timing mechanism, which mechanisms are respectively designated in general by the reference letters C, F and T in Fig. 1.
Figure 3:
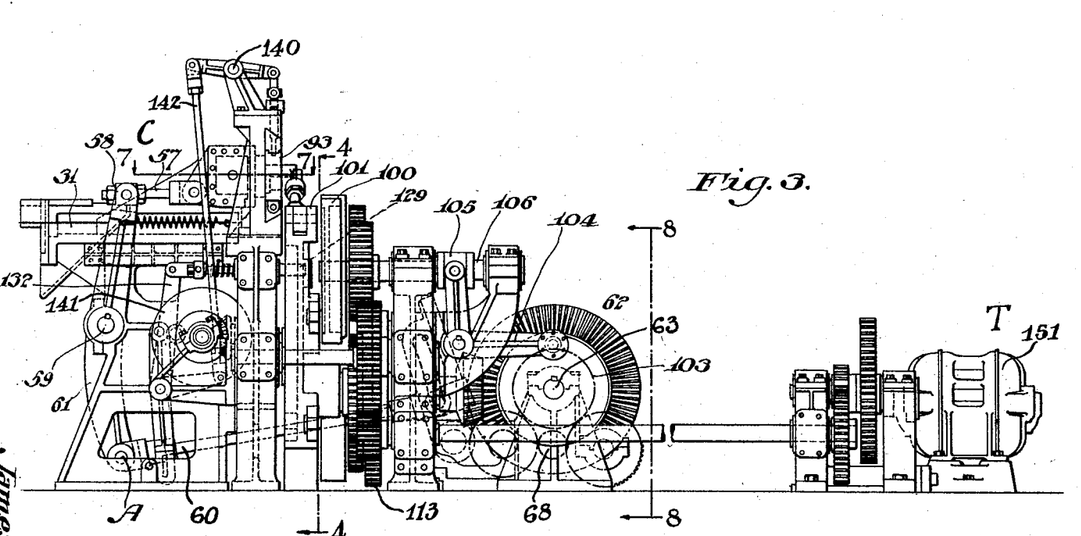
Fig. 3 is a side elevation of the mechanism of Fig. 2.

The cut-off and feeding mechanism C, referring now particularly to Figs. 2 and 3 for general views and Figs. 5 to 10 for detail views, receives the end of a bar ejected from the furnace by mechanism E along the line 30—30. The outer end is guided and supported by a channel shaped trough 31 fixed in position with respect to the doorway or projection aperture 32 of the furnace U (Figs. 2 and 3). This trough is provided on opposite sides with spring pressed teeth 33 the points of which are directed forwardly and engage in the sides of the hot bar and prevent backward movement of the bar either under the reverse movement of the ejector mechanism E or any of the cut-off and feeding movements of the mechanism C. The end 34 of the bar so projected is then within the range of movement of the cut-off and feeding jaws 35.

These jaws 35 (Figs. 5 and 7) are carried in seats 36 in the heads 37 of a pair of opposed fluid cylinders 38 disposed in a horizontal plane. These cylinders are slidably mounted by their exterior walls in guideways 39 of a rigid framework 40 disposed transversely of the mouth of the channel 31. The framework 40 is there supported in extended guides 42 for reciprocation parallel to the axis 30—30 of the bar to be cut and fed, which, of course, is the axis of the channel 31. The opposite ends 43 of the frame 40 have bolted to them the pistons 44 of the cylinders. The piston rods 45 through which they are bolted enter the cylinder through stuffing boxes in the removable heads 46 of the cylinders. The opposite heads of cylinders 37 are closed thereby providing for a double action therefor. Cut-off movement of jaws or knives 35 is achieved by the introduction of hydraulic pressure through ports 47 to the near end of cylinders 37 as respects the bar B, this side of the piston being of greatest area and affording, therefore, highest pressure. Withdrawal movement is accomplished by the introduction of hydraulic pressure through the ports 48 to the outer ends of cylinders 37 surrounding the large piston rods 45. In these ends the pistons are of relatively small area and, therefore, less pressure may be had but relatively greater speed of operation. Connection with ports 47 and 48 is effected by conduits 49 and 50, respectively, which have a rigid connection with the movable cylinders 37 effected through elongated slots 51 in the top of the relatively fixed framework 40. A re-entrant sleeve 52 affords an extended support for the out-board end of the bar immediately adjacent portion N being severed from the bar. On top of the frame 40 vertically above the axis 30—30 is mounted on a fixed axis an idler pinion 53. Meshing with this idler pinion on each side thereof is a pair of racks 54 respectively connected through conduits 49—50 and supplemental bolts 55 which operate through slots 56 with the opposite cylinders 37, whereby perfect symmetry of movement of knives 35 is assured, since any inequalities of resistance offered to the penetration of the knives 35 in bar B are equalized through the mechanical action of the gearing.

The frame 40 is reciprocated by means of the links 57 (Figs. 2, 3 and 7) which connect it to the oscillatable levers 58 which flank the guides 42. These levers are periodically oscillated about fixed shaft 59 by means of a link connection 60 between the extended ends 61 of the right hand lever 58 and the timing gears 62 (Figs. 2 and 3) by means of which this reciprocation is timed and regulated. The timing gears are driven from a constantly rotating shaft 63 through the intermediary of a fast forward and slow return movement 64. This movement and the train of gears 62 between it and the link 60 are shown most clearly in Figs. 8 to 10. The movement 64 is of the rotated pin and oscillatable slot variety, the pin 65 being carried by the disc 66 rotated by shaft 63 and the slot within which the pin engages being carried by an arm 67 which oscillates about shaft 68 displaced axially of but parallel to shaft 63. As clearly appears from the diagram in Fig. 9, complete revolution of the pin 65 results in fast forward movement of the arm 67 through the relatively small arc $a$ and slow return movement through the relatively large arc $b$, the latter commencing and ending when the path of travel of pin 65 becomes tangent to the center of the slot 67. The oscillation of shaft 68 is transmitted as oscillatory movement from shaft 68 through gear 69 carried thereby and the gears 70 and 71 carried by the idler shaft 72 to the gear 73 of an oscillatable shaft 74. This train of gears may or may not be segmental gears and are of radius deriving a proper angularity and rate of movement for shaft 74 suitable for the effective reciprocation of the frame 40 through the link 60. Link 60 is connected with shaft 74 through a pin and slot connection 75—76 with arm 77 fixed to shaft 74. Slot 76 is arc shaped, the arc being formed on a radius of the length of the link 60 and drawn when that link is in the position of extreme rearward movement. In this position the frame 40 is in its position of extreme forward movement and lever 77 like link 60 in the position of extreme rearward movement (to the right in Fig. 10). Pin 75 is adjustable with link 60 up and down as respects slot 76 by means of the adjustable screw connection 78 with the end 79 of the link 60. The result is that frame 40 of the cut off and feeding mechanism, and by the same token, the knives 35 thereof, always cease forward feeding movement in the same relatively fixed plane irrespective of the length of reciprocation of frame 40. For as the length of that reciprocation is adjusted through the shifting of pin 75, in slot 76, the adjustment is always to add to or take from the rear end of the stroke. The front end remains unaltered by reason of the geometrical relation of the parts just described.

Figure 7:
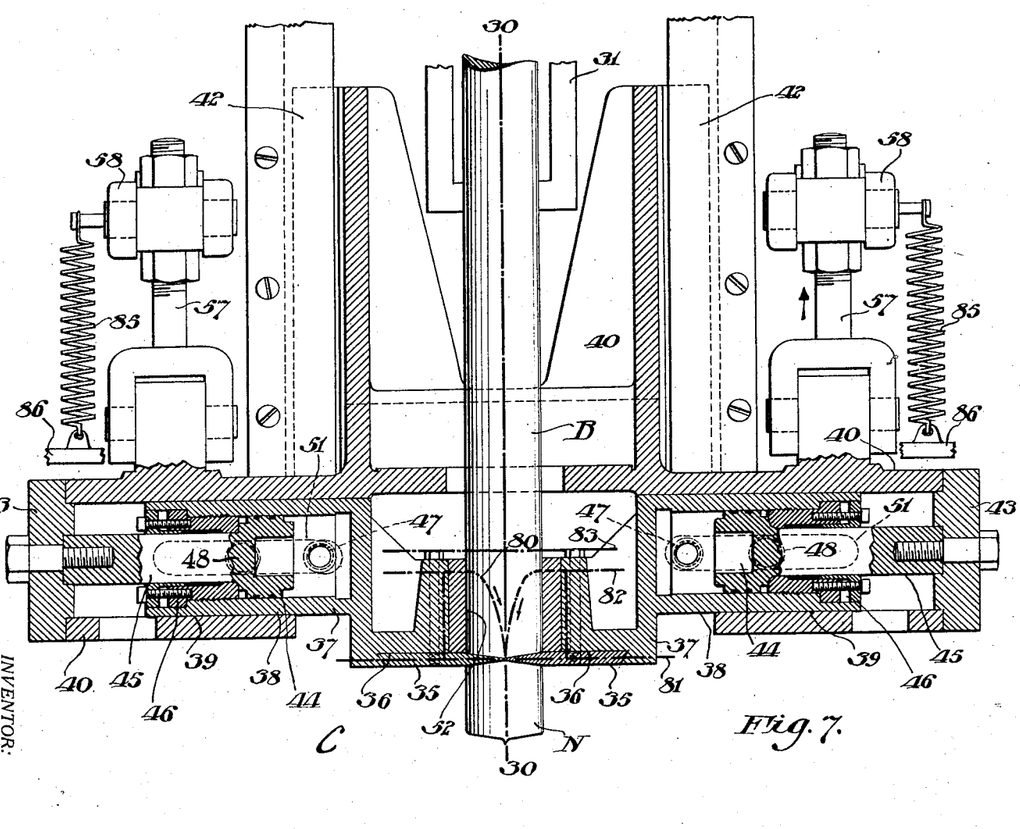
Fig. 7 is a horizontal cross section of this device and the pertinent parts on line 7—7 of Fig. 5 and approximately in the plane designated 7—7 in Fig. 3.

So organized, the train of gears 62 and their connections with the frame 40 in conjunction with hydraulic pressure applied to the cylinders 37 (the application of pressure being appropriately timed as will appear hereinafter) will carry the knives in their cut-off and feeding movement on cyclical paths of the form illustrated by the dash and dot line applied to the plan view of Fig. 7 and designated 80, the paths being thus traced by the cutting edges of the knives. The fixed plane of extreme forward movement of the cutting edges is designated 81. The relatively adjustable plane of the cutting edges in their extreme rearward movement is designated 82. Adjustment of pin 75 in slot 77 results in shifting this plane 82 toward or from the relatively fixed plane 81 to positions such as that designated 83.

With reference to the paths of movement of the cutting edges designated 80 withdrawn from the bar and resting in a plane such as 82, the application of pressure through ports 47 causes the knives to engage the hot bar and to effect sufficiently strong entry therein for the feeding movement to commence. This takes place just as the pin 65 (Fig. 9) of the fast and slow movement 64 approaches tangency with the center line 84 of lever 67 in advance of the fast movement thereof through the arc $a$. Immediately following, the forward fast feeding movement of knives 35 is brought about by the passage of pin 65 through the arc $a$. The actual path of movement of the knife edges is therefore inwardly and forwardly of the bar until they reach a position of close proximity to each other just before they reach the relatively fixed plane 81, at least by the time they have reached it. The bar is thus almost, but not entirely severed when the knife edges have reached the fixed plane 81. The portion remaining unsevered is strong enough, should the hydraulically operated knives reach their full depth before the forward feeding movement of the bar has been completed, to permit the full forward feeding of the bar. This uncut portion is, however, not of sufficient thickness or strength to appreciably resist the thrust at right angles thereto of the transfer mechanism, by which it is completely severed from the bar. Pressure is instantly reversed on cylinders 37 by withdrawal through port 47 and application through port 48 whereby the knives are withdrawn in the plane 81 and before pin 65 (Fig. 9) leaves its tangency with center line 84 of lever 67 occurring at the completion of the arc of fast movement $a$. Such pressure of withdrawal is maintained through ports 48 during the ensuing slow return movement brought about through passage of pin 65 through the relatively greater arc $b$. Thereupon the cycle is repeated, the engagement of the knives being brought about again by movement of approach to the bar and penetration thereof substantially in the adjustable plane 82. Thereby measured lengths of the bar are severed to form billets N of uniform length. Thereby these billets are always delivered from the cut-off and feeding mechanism C with their hinder ends in the same fixed plane 81.

During the relatively slow return movement of the cut-off and feeding mechanism energy is stored up in springs 85 to assist the mechanism in drawing the heavy massive bar B quickly forward on the advance movement. To this end the springs 85 are connected at one end to the levers 58 and at the other end to a relatively fixed part of a frame diagrammatically designated 86 so that they are stretched during the rearward movement in the direction of the arrows. This being a slow movement of several times the duration of the forward movement, much energy can be stored thereby and power of the motor required to operate the mechanism may thereby be considerably reduced. For the energy so gradually stored during the slow return movement becomes at once fully effective in the forward movement.

The pre-press mechanism P which lies between the cut-off and feeding mechanism F and the rolling mill R (Fig. 1), and which is shown in detail in Figs. 11 to 14, comprises a fixed pre-pressing die 87 fixed to the frame 88 of the rolling mill and relatively movable pre-pressing die 89 carried in a frame 90 of the frame 88 also fixed to the rolling mill. These dies may be in the form of end punches the function of which is to form sockets on the ends of the billets or of other form adapted to form projections thereon, or of any other suitable contour. Their main function is to prepare the end of the billet to be properly received and held in centered relation by the dies *r* of the rolling mill when presented thereto and during the subsequent engagement by and working of the dies *r*. The means for operating the movable die 89 consists of an hydraulic ram 91 connected with the die by the toggle linkage 92 in such fashion as to move die 89 toward die 87 under sufficiently great pressure to form the ends the required shape as the toggle 92 is extended.

Any other form of pre-pressing apparatus may be used. There are many forms of presses which would be suitable for the purpose.

The transfer mechanism F is comprised or comprises a transversely moving slide 93 (Figs. 3 and 4) provided with a transfer head 94 and reciprocable in slides 95 extending transversely of the axes of the several mechanisms C, P and R. The center of the transfer head 94 during this movement, and, therefore, the center of the billet being transferred, moves on a path 96 which intercepts the three parallel axes 30, 97, 98 (Fig. 4) of the mechanisms C, P and R. The slide 93 is driven by a train of gears 99 (Figs. 1, 2 and 3) of the timing mechanism T which impart to it an intermittent movement of the following nature; initially a dwell of the transfer head 94 in axial alignment of the axis 30 of the cut-off and feeding mechanism C, second, a movement of head 94 from this position to a position in alignment with the axis 97 of the pre-press P, third, a slight retraction from this position toward the axis 30 for a purpose presently to be described, fourth, an advance movement to a position of alignment with the axis 98 of the rolling mill R, fifth, complete return movement from alignment of head 94 with head 98 to the position of initial alignment of the axis 30. This is accomplished through the train of gears 99 of the timing mechanism T. The principle of these gears is like that of the pin and slot, Geneva gears 100—101. Gear 100 carries the pin 102. It is driven at a uniform rate of speed but pin 102 is axially reciprocated into and out of the plane of the slotted gear 101 by an axial reciprocation of gear 100. This axial reciprocation is accomplished by a constantly rotating cam 103 which imparts an oscillatory movement to bell crank 104 having a fixed sleeve connection 105 with the shaft 106 on which gear 100 is mounted. (See Figs. 2 and 3).

The gear 100 rotating in the direction of the arrow 107 (Fig. 4), when pin 102 enters slot 108 of gear 101, head 94 is moved from axis 30 to axis 97 whereupon pin 102 leaves slot 108 and head 94 rests momentarily in this position. During the next revolution of gear 100 pin 102 is axially removed from the plane of gear 101 so that it does not engage any slot of this character. On the second following revolution, however, it engages in the slot 109 which by reason of the advance of gear 101 in the initial movement now lies in the path of movement of the pin 102, for pin 102 has then been returned by cam 103 to the plane of the gear 101. This engagement moves head 94 from axis 97 to axis 98. Such movements are the first and third movements described.

Figure 4:
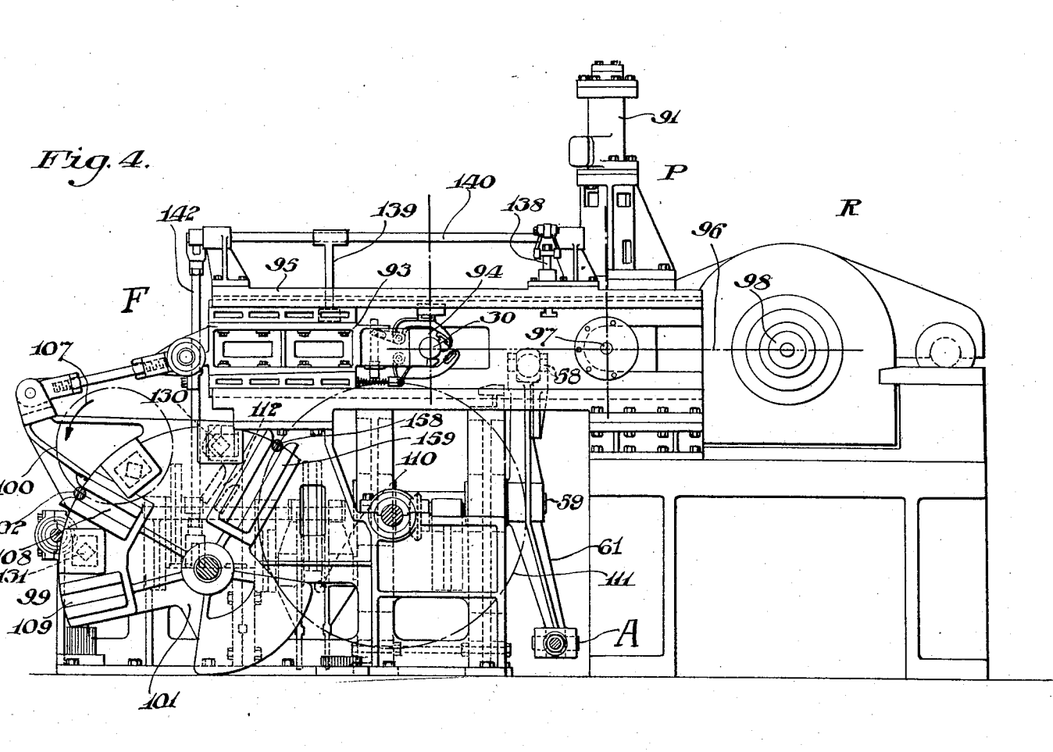
Fig. 4 is an enlargement of the cut-off and feeding mechanism C and the transfer mechanism F taken approximately on line 4—4 of Figs. 2 and 3. The transfer mechanism is shown in the position in which it receives a billet being fed from cut-off mechanism C.
Figure 5:
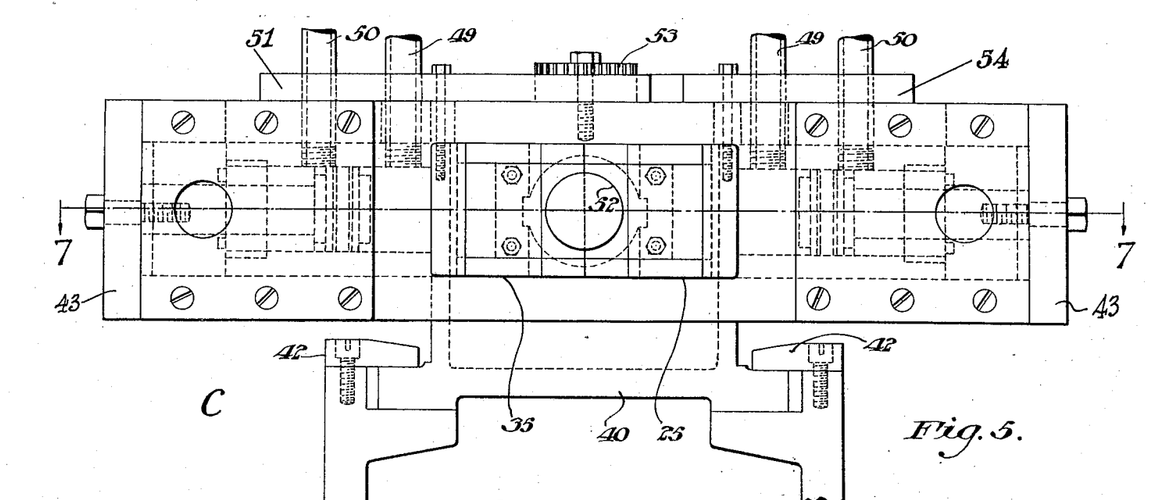
Fig. 5 is a front elevation approximately on line 5—5 of Fig. 2 of the device for operating the cut-off and feeding jaws of the cut-off and feeding mechanism C.
Figure 6:
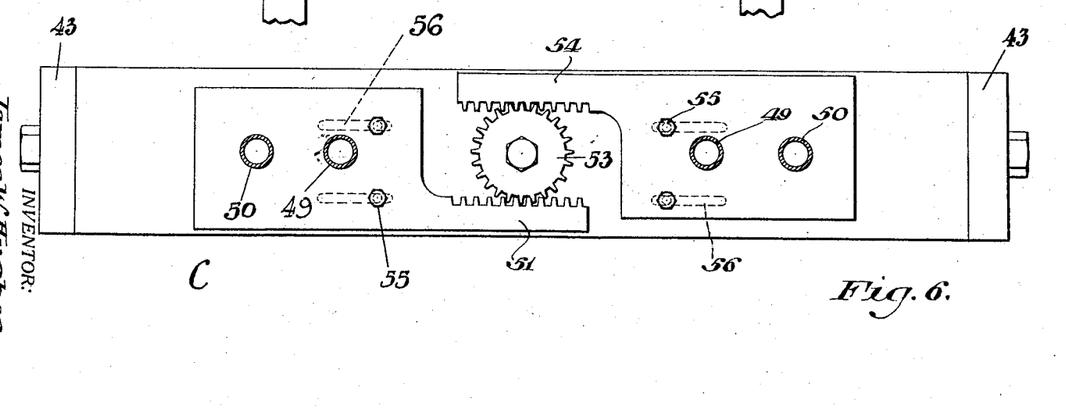
Fig. 6 is a top plan view of the device of Fig. 5.

The second movement described, to wit, the slight retraction from axis 97 is achieved by the engagement of a pin 110 on a large gear 111 of the timing mechanism T in a supplemental slot 112 on the gear 101, the relative angular position of the path of pin 110 and the slot 112 at the time pin 102 leaves slot 108 being such that engagement of 110—112 follows immediately and produces this slight retractive movement. Gear 111 is driven from the train 113 engaging directly with the train 99 which drives the transfer (See Fig. 2).

Figures 15, 17:
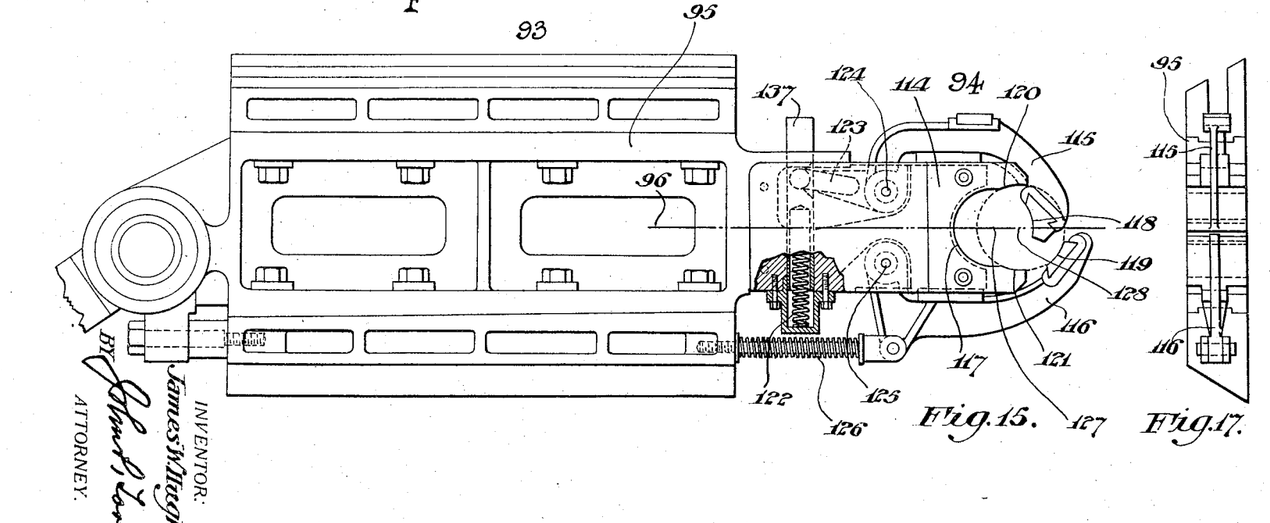
Figs. 15, 16 and 17 are respectively front elevation, top plan and right hand end views of the reciprocable jaws of the transfer mechanism F.
Figure 16:
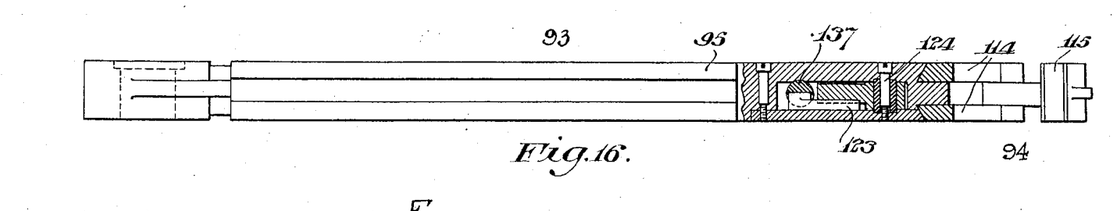

The head 94 (Figs. 15 to 17) is comprised of a fixed jaw 114 and two pivoted and relatively movable jaws 115 and 116. Fixed jaw 114 is provided with a semi-circular seat 117 of a radius equal to the radius of the billet as initially cut off. Movable jaw 115 is provided with a complemental seat 118 on the radius when the seat 118 is in normal position equal to the radius of seat 117 and having the same center. Movable jaw 116, however, is provided with a seat 119 of greater radius. This greater radius is equal to the radius of auxiliary seats 120, 121 formed on the ends of jaws 114 just beyond the seat 117, and when movable seat 119 is in normal position, the centers of seats 119—120—121 coincide. Moreover, the centers of all sets of seats when in normal position lie on line 96 (Figs. 15 and 4). Movable jaw 115 is held in its normal position with relation to jaw 114 by compression spring 122 which through pin and slot connection 123 biases jaw 115 about its pivot 124 on slide 95 toward the center of the seats 117—118. Similarly jaw 116 is biased about its pivot 125 toward a normal position by means of spring 126 between the jaw 116 and the slide 95. Suitable seatings of the jaws 115—116 against the ends of the jaw 114 or any equivalent means are utilized to define the normal positions. When head 94 is first centered on axis 97 at the end of the first movement, the center 127 of the main seats 117—118 lies on the axis 97 of the pre-press P. It is in this position that the pre-press engages and grasps the billet transferred to axis 97. Upon the slight retractive movement, however, occasioned by gears 112—110 just described, the center 127 is retracted and the center 128 of the auxiliary jaws 119—120—121 is located upon axis 97. In this position the jaws receive the billet as discharged from the pre-press and as enlarged in diameter by the pre-pressing operation.

In each the position on the axis 30 and the second position on axis 97, to wit, that in which the auxiliary jaw center 128 coincides with that axis, the head 94 is locked in fixed position. This locking is by means of a detent 129 which engages first in socket 130 and second in socket 131 (Figs. 2, 3 and 4). This pin is operated from lever 132 which is oscillated by cam 133 in timed relation to the movement of head 94 by Geneva gear 100—101. The timing is achieved by driving cam 133 from transfer shaft 134 having a beveled gear connection 135 with the shaft 136 which bears the gear 30 driven through train 113.

In each the initial position of head 94 on axis 30 and the initial position on axis 97, as the billet is initially delivered thereto with the center 127 of the main jaws 114—115 on axis 97, the movable jaw 115 of the head is released by the depression of the post 137 which is the slotted member of the slot and pin connection 123, the post 137 being directly engaged by spring 122. This depression is achieved by dogs 138 and 139 vertically reciprocated into engagement with post 137 in the respective positions of the head by the oscillation of a transfer shaft 140 with which these dogs have a link connection. The oscillation of shaft 140 is controlled by cam 141 having a link connection 142 therewith, and also in timed relation to the remaining mechanism through the connections 134, 135 and 136 just described. In this manner jaw 115 is open when the billet N is first received, is closed thereon immediately in advance of the transfer and is released therefrom when the pre-press mechanism P has gripped the billet. Thereafter in the slight retracting movement of head 94 from the axis 97, the billet is held yieldingly in the auxiliary seats 119—120—121.

The dies $r$ of the rolling mill R are relatively approached and separated by means of hydraulic cylinders 143 and 144 respectively. Rotation of both dies is by means of the driving unit D effecting driving connection through an electromagnetic clutch 145, brake 146 controlled by cam 147 of the timing mechanism T through the linkage 148 stops rotation of the dies as required. The approach and separation cylinders 143—144 are controlled from cams 149—150 of the timing mechanism T on the far side of the rolling mill R through the intermediary of suitable valve mechanism not necessarily described herein.

Figure 8:
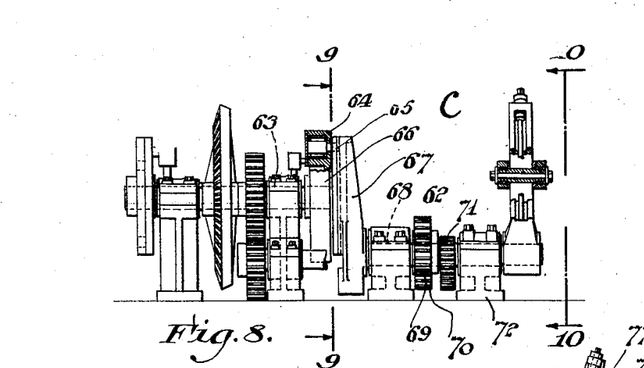
Fig. 8 is a front elevation of the gearing of the cut-off and feeding mechanism C taken approximately on line 8—8 of Figs. 2 and 3.
Figure 9:
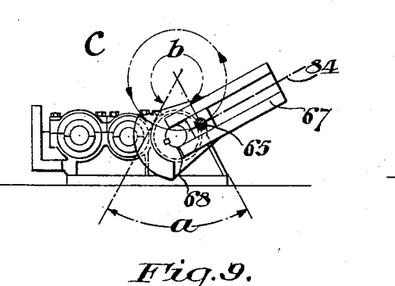
Fig. 9 is a transverse section of the gearing of Fig. 8 taken on line 9—9 thereof looking in the direction of the arrow.
Figure 10:
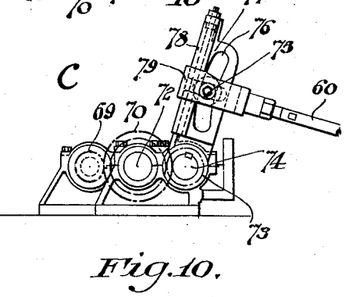
Fig. 10 is an end elevation of the right hand end of the gearing of Fig. 8 taken from the location 10—10.
Figure 11:
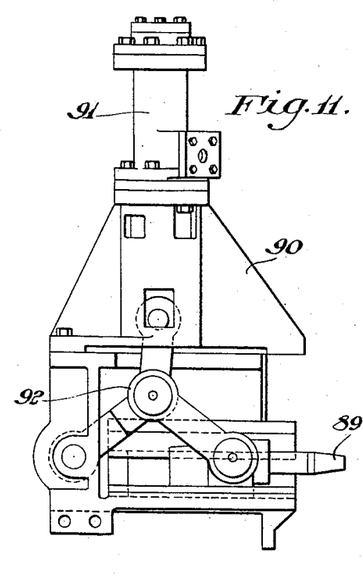
Figs. 11, 12, 13 and 14 are respectively side elevation, front elevation, top plan view and central vertical section of the pre-press mechanism P.
Figure 12:
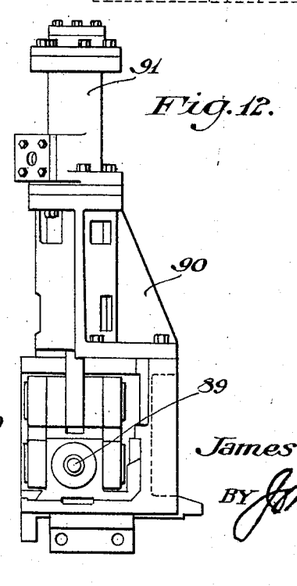
Figures 13, 14:
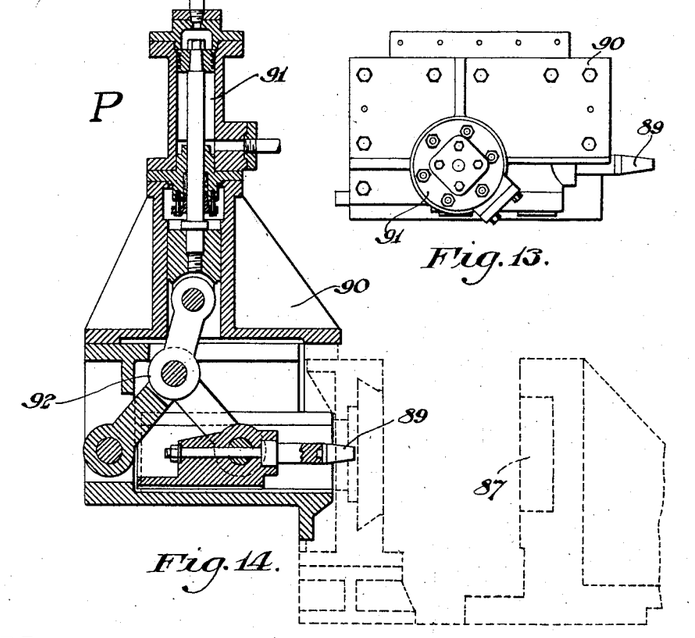

The interlocking mechanism between the several operating mechanisms described is electrical in character and of the form shown in Fig. 18. The interlock is through the control of the timing mechanism T jointly by the gears of the timing mechanism and by hydraulically operated elements of the cut-off and feeding mechanism C, the pre-press P, the rolling mill R and the transfer mechanism F. The arrangement is such that all mechanical operations, the completion of which is dependent upon the prior completion of an hydraulic operation, are interrupted before the danger zone of the mechanical operation is reached, and started for completion only after the hydraulic operation has been sufficiently completed to make the completion of the mechanical operation safe. In general, each such interlock comprises an electric switch which is operated to open the circuit of the timing mechanism motor when the mechanical operation approaches the danger zone and a second switch in parallel to the first and normally open, which is closed only when the hydraulic operation is sufficiently complete to insure safety in the completion of the mechanical operation. In Fig. 18, 151 is the driving motor of the timing mechanism, 152 an electromagnet cut-out for this motor, 153 a switch operated by any given mechanical operation as for example by cam or gear 154 when that operation approaches the danger zone, 155 the parallel normally open switch operated by any hydraulic operation, such for example as the hydraulic cylinders 35 of the cut-off mechanism. Obviously, if cam 154 opens switch 153, the circuit of motor 151 remains broken until switch 155 is closed on the completion of the cut-off operation effected by cylinder 156, by series circuit 157 of the cut-out 152 of the timing mechanism. Motor 151 is controlled in succession by a plurality of such parallelly arranged coacting switches whereby a succession of safety operations may be effected. Such control is provided in the apparatus described first between the jaws 35 of the cut-off and feeding mechanism C and the transfer mechanism F, whereby the transfer mechanism F cannot partake of its first transfer movement from axis 30 to axis 97 until or unless the cut-off operation has been completed; secondly, between the cut-off and feeding mechanism jaws 35 and the retracting mechanism therefor as shown in Figs. 8 to 10 so arranged that the retraction cannot take place until the jaws 35 have cleared the bar 30; thirdly, between the pre-press P and the transfer mechanism F in such manner that the transfer mechanism F does not engage upon its advance movement from 97 to axis 98 until or unless the pre-pressing operation is completed and the pre-press dies have withdrawn from the ends of between the billet; fourthly, the rolling mill dies $r$ and the transfer mechanism F in such a manner that the transfer mechanism F may not enter between the dies unless they have been sufficiently separated for free entry; fifthly, between the dies r of the rolling mill R and the transfer mechanism F in such a manner that the dies r may not be approached toward each other beyond a certain point necessary to grip and center the billet fed thereto except the transfer mechanism is retracted beyond the zone in which head 94 may be fouled by the dies r. Obviously, other applications may be made in any case where the hydraulic and mechanical operations are characterized by inter-dependency.

The operation of the machine is as follows—the bars being heated to proper temperature in the furnace U, the machine is started by turning on the power of the hydraulic plant L, and rolling mill drive D. The hydraulic plant L does not supply pressure to the rolling mill cylinders 143—144 until the timing mechanism is in operation. So also the driving plant D does not rotate the rolls until the electromagnet clutch 145 is engaged, since that clutch is normally disengaged. The push-out mechanism G is then operated to push a bar from the furnace sufficiently forward to be engaged by the jaws 35 of the cut-off and feeding mechanism C. Thereupon the motor 151 of the timing mechanism T is started and the mechanisms of the apparatus go through the following cycle.

Assuming the transfer mechanism F to be in the position shown in Fig. 4 with the transfer head 94 on axis 30 and pin 102 disengaged from slot 108 by reason of the rearward axial movement of the pin, under control from the timing mechanism not necessarily shown here, fluid is admitted to the hydraulic cylinders of the cut-off and feeding mechanism C to operate jaws 35 to engage bar B and sever billet N therefrom. This engagement is along the path 80 as described and shown in connection with Fig. 7. During this engagement the bar is fed forward and the billet N projected into transfer head 94 on axis 30. Thereupon transfer mechanism F is pushed forward by the engagement of pin 102 in slot 108 (Fig. 4) and the cut-off billet N removed from bar B and projected to axis 97 of the pre-press P. Thereupon operation of the timing mechanism opens the valve admitting fluid pressure to the hydraulic cylinder 91 of the pre-press and the pre-press engages, centers and preforms the end of the billet. But immediately following initial engagement, transfer head 94 is retracted slightly by engagement of gears 110—112 (Fig. 4) whereby the auxiliary seats 119—120—121 are positioned to receive and center the billet as its diameter is enlarged in the pre-pressing operation. The pre-pressing dies 87—89 being receded from each other and the billet having been freed from the fixed die 87 by an appropriate knock-out mechanism not shown, the transfer mechanism F operates upon its third movement transferring the billet from axis 97 toward axis 98. This movement is achieved by engagement of pin 102 in slot 109 (Fig. 4). Here there is a dwell during which head 94 is locked in position on axis 98 by devices 129—130 in the same manner as it was previously locked in position on axis 97. Dies r are previously retracted and approach the billet N so held in readiness and grip and center it. Thereupon the positioning devices 129, 130 are released and transfer mechanism F is operated on its full back stroke by the engagement of pin 158 on the large gear 111 (Fig. 4) with the slot 159 of gear 151 and when head 94 reaches axis 30 is held in this position by the devices 129—130. In the meantime the electromagnetic clutch 145 has been closed from the timing mechanism by means not necessarily shown, the brake 146 has been released by cam 147 and rotation of dies r ensues, rolling the prepared billet to the form in which dies r have been prepared. During this rolling operation the dies are continually approached toward each other under hydraulic pressure of the approach cylinders 143. At the close of the operation the timing mechanism admits pressure to the retracting cylinders 144 and dies are separated and the rolled product released therefrom. Each and all of these operations are initiated, furthered and closed or terminated and the parts restored to their initial positions through automatic control of the timing mechanism T, the various mechanical mechanisms, the various valves incident to the supply of hydraulic pressure and the various switches incident to the control of the electric motors being operated in timed relation therefrom. The mechanical movements, the valves and the switches are effective through appropriate cams and gears. Cams are most largely used by reason of the great latitude of the adjustment which they permit. The cycle is repeated, its repetition being commenced preferably before the close of the rolling operation last described. The cut-off and feeding mechanism C and the pre-press mechanism P either or both function during the interval of functioning of the rolling mill R. Obviously, many changes in precise timing may be made without departing from the generic spirit of the cycle which I have invented. A machine so organized and so operated is completely automatic. Upon the completion of fabrication of the one bar B, the second bar is moved by the ejecting mechanism G right up behind it and the cyclical operations continue in the fabrication of the second bar.

It is obvious that in an apparatus of the extent of this one and in a series of operations of the length of that involved in the operation of such an apparatus both the mechanisms of the apparatus and the operations themselves and even the particular methods entering into those operations are susceptible of a coordinately enlarged number and range of modifications and substitution of equivalents without in any wise departing from the generic sprit of the invention involved.

What I claim as new and useful is:—

1. A feeding mechanism of the character described comprising means to support the bar and opposed cut-off jaws on opposite sides of the bar and means for substantially simultaneously giving the jaws a combined cut-off and bar feeding movement on a path entering the bar behind its end a distance equal to the length of the portion to be fed and leaving the bar in the original plane of the advance end of the portion to be fed.

2. An automatic feeding mechanism of the character described comprising means to support the bar longitudinally and a pair of opposed jaws on opposite sides of the bar and means for substantially simultaneously giving the jaws a combined bar feeding and cut-off movement on a path initially entering the bar in a plane removed from the initial plane of the end of the bar a distance equal to the length of the portion to be fed and leaving the bar in the initial plane of the advance end, which paths of movement approach most closely to each other in said latter plane.

3. An automatic feeding mechanism of the character described comprising means to support the bar longitudinally and a pair of opposed jaws on opposite sides of the bar and means for substantially simultaneously giving the jaws a combined bar feeding and cut-off movement on a path initially entering the bar in a plane removed from the initial plane of the end of the bar a distance equal to the length of the portion to be fed and leaving the bar in the initial plane of the advance end, which paths of movement reach a point of substantial contiguity to each other before they leave the bar.

4. An automatic feeding mechanism of the character described comprising means to support the bar longitudinally and a pair of opposed jaws on opposite sides of the bar each having a bar feeding and cut-off movement on a path initially entering the bar in a plane removed from the initial plane of the end of the bar a distance equal to the length of the portion to be fed and leaving the substantially severed bar in the initial plane of the advance end, which paths of movement reach a point of substantial contiguity to each other before they leave the bar but do not contact with each other, together with a blank transfer mechanism which receives the substantially severed blank and has a motion at an angle to the bar whereby the received blank is completely severed upon motion of the transfer mechanism.

5. An automatic feeding mechanism of the character described comprising means to support the bar longitudinally and a pair of opposed jaws on opposite sides of the bar each having a bar feeding and cut-off movement on a path initially entering the bar in a plane removed from the initial plane of the end of the bar a distance equal to the length of the portion to be fed and leaving the substantially severed bar in the initial plane of the advance end, together with a transfer mechanism having a transfer movement on a path arranged at 90° to the bar and a receiving seat adapted to give longitudinal support to the portion of the bar being fed and cut off, whereby the substantially severed portion to be fed is upon movement of the transfer mechanism transferred with its axis parallel to the bar from which it has been severed.

6. An automatic feeding mechanism of the character described comprising cut off jaws having both cut off and feeding movement, means to longitudinally support a bar in position to be operated upon and fed by said jaws, a single means for operating said jaws upon both feeding and return strokes, and an energy storing device operated from said means upon the back stroke effective during the forward stroke to add energy to the energy of said forward stroke.

7. An automatic feeding mechanism of the character described comprising cut off jaws having both cut off and feeding movement, means to longitudinally support a bar in position to be operated upon and fed by said jaws, a single means for operating said jaws upon both feeding and return strokes, and having springs biasing said jaws upon their forward stroke placed under tension during the return stroke.

8. An automatic cut off and feeding mechanism of the character described comprising cut off jaws which have a feeding movement, means to support a bar in position to be cut off and fed by said jaws, and operating means for said jaws comprising a variable throw lever, and means to vary the throw comprising an operating lever and a link connecting the levers, and having one end adjustable through an arc on one lever and about a center on the other.

9. An automatic cut off and feeding mechanism of the character described comprising cut off and bar feeding jaws the forward extremity of feeding movement of which lies always in the same plane and the backward extremity of feeding movement of which may lie in different planes, and said opposed cut off and feeding jaws being independently operated by hydraulic means but mechanically linked together to insure a symmetry of cut off and feeding movements.

10. An automatic feeding mechanism of the character described comprising in combination a forging machine, a pre-press adapted to pre-shape the ends of a blank to be received and held in the forging machine when fed thereto and a transfer mechanism having a feeding movement from pre-press to forging machine and at one point of said movement receiving the pre-pressed blank in the attitude to be delivered to the forging machine and in the other delivering the received blank in the attitude required for reception by the forging machine.

11. An automatic cut off and feeding mechanism comprising in combination a forging machine, a cut-off and feeding mechanism for bar stock comprising cut off jaws, a pre-press adapted to shape the ends of the blank as cut to form receivable by said forging machine when fed thereto, and a transfer mechanism receiving the cut off and fed blank and transferring it first to the pre-press and then to the forging machine in the attitude required for reception by said forging machine.

12. In a machine of the character described, a cut off and feeding mechanism for bar stock, a pre-press and a forging machine arranged with their axes of operation upon the blank in substantially parallel relation to each other and a transfer mechanism arranged to receive and transfer a cut off and fed blank from one machine to the other in succession with the axis of the blank in substantial parallelism to said machines.

13 In automatic feeding mechanism of the character described composing a forging machine adapted to receive and operate upon axially symmetrical blanks cut from bar stock, a cut off and feeding mechanism for blanks from bar stock the jaws of which cut the blanks in axially symmetrical form, a pre-press intermediate the cut off feeding mechanism and the forging machine adapted to symmetrically form the cut ends of the blank for reception by said forging machine, and transfer mechanism to pass the cut off and fed blank first to the pre-press and then to the forging machine.

14. An automatic feeding mechanism for forging machines operating on blanks formed from bar stock comprising a forging machine, a cut off and feeding mechanism for the bar stock blanks and a transfer device having jaws adapted to receive the cut off blank directly and independently of any other blank supporting means from the cut off and feeding mechanism and transfer it to the forging machine, the axes of which mechanisms and the jaws are in substantial parallelism.

15. A cut off and feeding mechanism, a pre-press and a forging machine arranged with their axes in substantial parallelism and a pre-positioned clutch for the cut off and fed bar stock reciprocable transversely of said axis in one position receiving the cut off and fed stock, in another position presenting the same to the pre-press for pre-forming of the cut ends and in the third position presenting the pre-formed blank to the forging machine, and means in each the receiving and pre-pressing positions for locking the clutch in such positions independently of the transfer mechanism.

16. A cut off and feeding mechanism of the character described comprising a forging machine, a pre-press, and a transfer feeder for both the pre-press and the forging machine, which feeder is provided with means of changeable dimension to receive the blank before and after the operation of the pre-press whereby the enlargement of the blank by the pre-press is accommodated.

17. An automatic feeding mechanism for forging machines comprising in combination a forging machine and a pre-press and a feeding jaw for said machines having a blank receiving seat of one dimension operative when the jaw feeds a blank to the pre-press and a blank receiving seat of another dimension operative when the jaw receives the blank acted upon by the pre-press and delivers it to the forging machine.

18. An automatic feeding mechanism of the character described comprising a forging machine and a pre-press therefor together with a blank transfer device operating to deliver the blank to the pre-press and to transfer the same from the pre-press to the forging machine and including relatively movable blank moving jaws together with means to release said jaws upon engagement of the blank by the pre-press, means to re-engage said jaws upon completion of the operation of the pre-press, and means whereby said jaws automatically release the blank upon withdrawal of the transfer after delivery of a blank to the forging machine.

19. An automatic feeding mechanism of the character described comprising a forging machine, a pre-press and relatively yielding jaws arranged to receive and transfer a blank to the pre-press and from the pre-press to the forging machine which jaws are releasable through the withdrawal movement from a blank received by the forging machine, together with means independent of the withdrawal movement for releasing the jaws from the blank when received in the pre-press.

20. A machine of the character described comprising a combined cut off and feeding mechanism for bar stock comprising means to longitudinally support the bar, feeding jaws for said bar and means for operating said feeding jaws on forward and back strokes which means has a fast forward movement and a slow return movement.

21. In a forging machine of the character described, comprising a furnace for heating long bars of material, a cut-off and feed mechanism for drawing said bars from the furnace and simultaneously cutting billets from the end of the bar, a transfer mechanism for receiving and transferring said billet to the dies of a rolling mill, and means for automatically operating said mill with the aforesaid mechanisms in synchronous relation.

22. Transfer mechanism of the character described, comprising a reciprocable member having means for releasably gripping the work, and means to reciprocate said member, including mechanisms arranged to cause two transfer movements in one direction and a single return movement.

23. Feeding mechanism of the character described, comprising a reciprocable member, having cutting elements movable transversely thereof and engaging the work for feeding the same, and means for operating said cutting elements independently of said reciprocation but simultaneously with the feeding movement.

24. Feeding mechanism of the character described, comprising a reciprocable work feeding member, an oscillatable link having a quick return motion, a member connecting said link with said reciprocable member, having an adjustable connection with said link to vary the stroke of said reciprocable member.

25. Feeding mechanism of the character described, comprising cutting off means to sever bars into billets, a pre-pressing device, a rolling mill means to convey said billets to said pressing device and to said mill and means controlling all of said devices and the rolling of said mill to ensure synchronization thereof.

26. Feeding mechanism of the character described comprising a reciprocable feeding member bearing transversely movable cutting and gripping members, means for causing a slow feeding stroke and a quick return stroke of said first named member and means for adjusting the initial point of said feeding stroke and the final point of said return stroke.

27. Transfer mechanism of the character described, comprising a reciprocating transfer member operable to transfer a billet from a cutting device to a working device in two steps, and means intermediate said steps for causing an initial working of said billet.

28. Transfer mechanism of the character described, comprising a reciprocating transfer member operable to transfer a billet from a cutting device to a working device in two steps, and means intermediate said steps for causing an initial working of said billet, and common means for operating said feed member and controlling said cutting and working devices.

In testimony whereof he hereunto affixes his signature.

JAMES W. HUGHES.